(12) United States Patent
Kino

(10) Patent No.: US 7,693,019 B2
(45) Date of Patent: Apr. 6, 2010

(54) INFORMATION RECORDING DEVICE, METHOD OF CONTROLLING RECORDING OPERATION OF SAID DEVICE, AND PROGRAM FOR CONTROLLING RECORDING OPERATION OF SAID DEVICE

(75) Inventor: Tetsuro Kino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 970 days.

(21) Appl. No.: 11/100,569

(22) Filed: Apr. 7, 2005

(65) Prior Publication Data
US 2005/0232110 A1 Oct. 20, 2005

(30) Foreign Application Priority Data
Apr. 8, 2004 (JP) ............... 2004-114077

(51) Int. Cl.
G11B 7/12 (2006.01)
(52) U.S. Cl. .................................. 369/53.21
(58) Field of Classification Search ............. 369/47.12, 369/53.21, 53.22
See application file for complete search history.

(56) References Cited

U.S. PATENT DOCUMENTS

| | | | | |
|---|---|---|---|---|
| 5,805,551 | A * | 9/1998 | Oshima et al. ............... 705/57 |
| 6,526,010 | B1 * | 2/2003 | Morioka et al. ........... 369/47.15 |
| 6,587,948 | B1 * | 7/2003 | Inazawa et al. ............ 713/193 |
| 6,687,826 | B1 * | 2/2004 | Owa ........................... 713/193 |
| 6,938,162 | B1 * | 8/2005 | Nagai et al. ................. 713/189 |
| 2001/0038694 | A1 * | 11/2001 | Senshu ....................... 380/201 |
| 2002/0080960 | A1 * | 6/2002 | Kanayama et al. .......... 380/201 |
| 2002/0114239 | A1 | 8/2002 | Yokokawa |
| 2003/0169661 | A1 * | 9/2003 | Nozaki ..................... 369/53.21 |
| 2004/0151090 | A1 * | 8/2004 | Suzuki ..................... 369/47.22 |
| 2004/0233832 | A1 | 11/2004 | Sako et al. |
| 2004/0243831 | A1 | 12/2004 | Sako et al. |
| 2005/0099897 | A1 | 5/2005 | Sako et al. |

FOREIGN PATENT DOCUMENTS

| | | |
|---|---|---|
| CN | 1317792 A | 10/2001 |
| JP | H05-290381 | 11/1993 |
| JP | 2001-6344 | 1/2001 |
| JP | 2001-202694 | 7/2001 |
| JP | 2003-281821 | 10/2003 |
| JP | 2004-062778 | 2/2004 |
| JP | 2004-87063 | 3/2004 |
| WO | WO 02/067249 A1 | 8/2002 |

OTHER PUBLICATIONS

Notice of Rejection of Japanese Patent Application No. 2004-114077 dated Mar. 18, 2008.

* cited by examiner

*Primary Examiner*—Thang V Tran
*Assistant Examiner*—Thomas D Alunkal
(74) *Attorney, Agent, or Firm*—Dickstein Shapiro LLP

(57) ABSTRACT

An information recording device having a recording head for recording information on a recording medium includes: an inherent ID generator that generates an inherent ID for the recording medium; an inherent ID recording unit that records the generated inherent ID on the recording medium with the recording head; an encryption key generator that generates an encryption key, based on the inherent ID; an encrypting unit that encrypts contents information, using the generated encryption key; and a contents recording unit that records the encrypted contents information on the recording medium with the recording head.

6 Claims, 10 Drawing Sheets

| INHERENT ID | CONTENTS MANAGEMENT INFORMATION |
|---|---|

FIG.8

| AD (THOUSANDS PLACE) 4BIT | AD (HUNDREDS PLACE) 4BIT | AD (TENS PLACE) 4BIT | AD (ONES PLACE) 4BIT | |
|---|---|---|---|---|
| MONTH (TENS PLACE) 1BIT | MONTH (ONES PLACE) 4BIT | DAY (TENS PLACE) 4BIT | DAY (ONES PLACE) 4BIT | DAY OF THE WEEK 3BIT |
| HOUR (TENS PLACE) 4BIT | HOUR (ONES PLACE) 4BIT | MINUTE (TENS PLACE) 4BIT | MINUTE (ONES PLACE) 4BIT | |
| SECOND (TENS PLACE) 4BIT | SECOND (ONES PLACE) 4BIT | | | |

AD  [2000-9999] 4DIGIT BCD

MONTH [1-12] 2DIGIT BCD

DAY  [1-31] 2DIGIT BCD

DAY OF THE WEEK  3BIT
    0: SUNDAY
    1: MONDAY
    2: TUESDAY
    3: WEDNESDAY
    4: THURSDAY
    5: FRIDAY
    6: SATURDAY

HOUR  [00-23] 2DIGIT BCD

MINUT  [00-59] 2DIGIT BCD

SECOND [00-59] 2DIGIT BCD

INFORMATION RECORDING DEVICE, METHOD OF CONTROLLING RECORDING OPERATION OF SAID DEVICE, AND PROGRAM FOR CONTROLLING RECORDING OPERATION OF SAID DEVICE

BACKGROUND OF THE INVENTION

1. Field of the Invention

The present invention relates to an information recording device such as an optical disk device having a recording head such as an optical pickup for recording information on a recording medium such as an optical disk, and also relates to a method of controlling the recording operation of the device and a program for controlling the recording operation of the device.

2. Description of the Related Art

In the case where contents information such as movies and broadcasting programs that involve copyrights information is to be recorded on a recording medium such as an optical disk, the contents information is encrypted so as to prevent unauthorized copying. Various methods and techniques to protect copyrights have been developed. For example, the inherent ID recorded on each optical disk during the optical disk manufacturing process is used to generate an encryption key that is required for encrypting contents information. In this manner, a different encryption key can be generated for each optical disk. The recorded inherent ID is read out from an optical disk, and the encryption key for encrypting contents information is generated. Using the encryption key, the contents information to be recorded is encrypted, and is then recorded on the optical disk. Thus, the data recorded on the optical disk can be protected. Meanwhile, in a reproducing device, the inherent ID is acquired from the optical disk, and a common encryption key is generated, based on key generating information that is stored in the device. Using the common encryption key, the encrypted contents information is decrypted and decoded for reproduction.

By the above described conventional method, however, the region in which an inherent ID is recorded on an optical disk during the manufacturing process is normally a disk management information recording region such as the Lead In area that is preset as an access region at the time of an access to the optical disk. When such an optical disk is loaded into an optical disk device to start a recording operation, the inherent ID might not be read out from the optical disk for some reason. In such a case, the contents information cannot be encrypted. Also, once recorded, the inherent ID cannot be updated or changed, which might cause inconvenience.

In the case where inherent IDs are recorded during the manufacturing process before optical disks are shipped, the product control becomes easier at the factory. However, as a different inherent ID is allocated to each optical disk, more time and costs are required for manufacturing the optical disks. Also, in a case where serial numbers are used as inherent IDs to be recorded on optical disks, same numbers (inherent IDs) are not allocated to optical disks, and it is easy to manage the numbers. In this case, however, the numbers can be easily predicted for unauthorized use. As a result, the copyrights protection might become insufficient.

SUMMARY OF THE INVENTION

A general object of the present invention is to provide a color image forming method and a color image forming apparatus in which the above disadvantages are eliminated.

A more specific object of the present invention is to provide an information recording device that can use less expensive recording media on which inherent IDs are not recorded during the manufacturing process, and enables proper handling of the inherent IDs allocated to the respective recording media for encrypting information to be recorded on the recording media.

The above objects of the present invention are achieved by an information recording device that has a recording head for recording information on a recording medium. This information recording device includes: an inherent ID generator that generates an inherent ID for the recording medium; and an inherent ID recording unit that records the generated inherent ID on the recording medium with the recording head.

With this structure, the information recording device generates an inherent ID for each recording medium, and causes the recording head to record the inherent ID on the recording head. Accordingly, the problem of failing to read out the inherent ID during a recording operation is eliminated, and the inherent ID can be acquired with certainty. Thus, the inherent ID can be handled properly, and can be utilized in the management of each recording medium and the recording with a copyrights protecting function. Also, as it is possible to use recording media on which inherent IDs are not recorded during the manufacturing process, inexpensive recording media can be used to record information that requires security against unauthorized use.

The above objects of the present invention are also achieved by an information recording device that has a recording head for recording information on a recording medium, including: an inherent ID generator that generates an inherent ID for the recording medium; an inherent ID recording unit that records the generated inherent ID on the recording medium with the recording head; an encryption key generator that generates an encryption key, based on the inherent ID; an encrypting unit that encrypts contents information, using the generated encryption key; and a contents recording unit that records the encrypted contents information on the recording medium with the recording head.

With this structure, the information recording device generates an inherent ID for each recording medium, and causes the recording head to record the inherent ID on the recording head. Also, the inherent ID is used to generate an encryption key for encrypting contents information. Accordingly, the problem of failing to read out the inherent ID during a recording operation is eliminated, and the inherent ID can be acquired with certainty. Thus, the inherent ID can be handled properly, and can be utilized in the management of each recording medium and the recording with a copyrights protecting function. Also, as it is possible to use recording media on which inherent IDs are not recorded during the manufacturing process, inexpensive recording media can be used to record information that requires security against unauthorized use.

In the above information recording device, the inherent ID recording unit records the inherent ID on the recording medium after the recording medium in a non-recorded state is loaded into the device and before the contents information is recorded.

Also in the above information recording device, the encryption key generator generates the encryption key, based on the inherent ID that is read out from the recording medium.

With this structure, the inherent ID is recorded on the recording medium at the time when the recording medium in a non-recorded state is loaded into the device. Accordingly, the possibility of losing or erasing the inherent ID during the time between the start and the end of the contents information recording operation is low. When the inherent ID is required, it can be read out from the predetermined location on the recording medium. Furthermore, as the inherent ID is recorded on the recording medium in a non-recorded state, highly reliable inherent ID recording can be performed, compared with a case where an inherent ID is overwritten on other recorded data.

The above information recording device may further include an inherent ID storing unit that stores the generated inherent ID in a memory. In this information recording device, the encryption key generator generates the encryption key, based on the inherent ID that is read out from the memory; and the inherent ID recording unit reads out the inherent ID from the memory, and may record the inherent ID on the recording medium at the time when an instruction to remove the recording medium is issued.

With this structure, the inherent ID is not recorded on the recording medium until an instruction to remove the recording medium is issued from a user. Accordingly, there is no need to record or read out the inherent ID on or from the recording medium, until an instruction to remove the recording medium is issued. Instead, the inherent ID should be read out from the memory. As a result, the possibility of failing to read out the inherent ID can be greatly reduced, and more proper handling of the inherent ID can be realized.

In the above information recording device, the encryption key generator generates the encryption key, based on the inherent ID that is read out from the memory; and the inherent ID recording unit reads out the inherent ID from the memory, and may record the inherent ID on the recording medium at the time when an instruction to perform a finalizing operation on the recording medium is issued.

In a case where an instruction to remove the recording medium may be issued before the instruction to perform the finalizing operation is issued, the information recording device further includes: a management information storing unit that stores contents management information corresponding to the encrypted contents information in a non-volatile memory, the contents management information being recorded together with the encrypted contents information on the recording medium, and being associated with the inherent ID; and an inherent ID readout unit that reads out the inherent ID from the non-volatile memory, when the recording medium is reloaded into the device, and the contents management information recorded on the recording medium matches the contents management information stored in the non-volatile memory.

With this structure, the inherent ID is not recorded on the recording medium until an instruction to perform a finalizing operation on the recording medium is issued from a user. Accordingly, there is no need to record or read out the inherent ID on or from the recording medium, until an instruction to perform a finalizing operation is issued. Instead, the inherent ID should be read out from the memory. As a result, the possibility of failing to read out the inherent ID can be greatly reduced, and more proper handling of the inherent ID can be realized. Since the inherent ID is not recorded on the recording medium until an instruction to perform a finalizing operation is issued, the encrypted contents information cannot be decrypted without the inherent ID, even if the recording medium removed before the finalizing operation is loaded into another information recording device. Accordingly, the contents information security can be further increased. Also, in the case where the recording medium is removed in accordance with an instruction to remove the recording medium issued before the finalizing operation, and the recording is medium is reloaded into the device, the recording medium can be properly identified and acquired.

In the above information recording device, the inherent ID recording unit reads out the inherent ID from the memory and may record the inherent ID in an unused area in a region for temporary media management information that is generated every time an operation of recording encrypted contents information is ended.

With this structure, the inherent ID is read out from the memory and is recorded in an unused area in the region for storing the temporary media management information that is generated every time an operation of recording encrypted contents information is ended. Accordingly, if necessary, contents information can be recorded in such a format that the inherent ID can be easily updated or changed in response to a request to nullify already recorded contents information.

In the above information recording device, the inherent ID generator generates a new inherent ID in accordance with an instruction from a user, and the inherent ID recording unit sets an ultimate inherent ID and records the ultimate inherent ID in a media management information region on the recording medium, when an instruction to perform a finalizing operation on the recording medium is issued.

With this structure, after already recorded contents information is nullified in response to a request to do so, the inherent ID is updated or changed in accordance with an instruction from a user before contents information is recorded. The inherent ID is not recorded in the media management information region, until the ultimate inherent ID is set in accordance with an instruction to perform a finalizing operation on the recording medium. Accordingly, the contents information that is encrypted and recorded using any inherent ID other than the ultimate inherent ID cannot be decrypted, and reproduction of the contents information can be prevented. Thus, the contents information can be protected as desired by the user.

The above information recording device may further include a disabling unit that causes the recording head to perform a recording operation on the region in which the inherent ID of a writable recording medium is recorded, so as to disable readout of the inherent ID.

With this structure, such a recording operation as to disable the readout of the inherent ID is performed on the region in which the inherent ID of a writable recording medium is recorded is performed. When the recording medium is to be discarded, other data such as dummy data is overwritten on the data of the inherent ID, so as to disable the readout of the inherent ID. Accordingly, the contents information that is encrypted using the inherent ID cannot be read. Thus, the recording medium can be readily discarded, while high information security is maintained. Also, in the case where the data recorded on a recording medium is copied onto another recording medium and the original recording medium is discarded, the data transferring process can be easily carried out, while high information security is maintained.

The above objects of the present invention are also achieved by a method of controlling a recording operation of an information recording device having a recording head for recording information on a recording medium. This method includes the steps of: generating an inherent ID for the recording medium, using an inherent ID generator; recording the generated inherent ID on the recording medium with the recording head; generating an encryption key, based on the inherent ID; encrypting contents information, using the generated encryption key; and recording the encrypted contents information on the recording medium with the recording head.

By this method, the information recording device generates an inherent ID for each recording medium, and causes the recording head to record the inherent ID on the recording head. Also, the inherent ID is used to generate an encryption key for encrypting contents information. Accordingly, the problem of failing to read out the inherent ID during a recording operation is eliminated, and the inherent ID can be acquired with certainty. Thus, the inherent ID can be handled properly, and can be utilized in the management of each recording medium and the recording with a copyrights protecting function. Also, as it is possible to use recording media on which inherent IDs are not recorded during the manufacturing process, inexpensive recording media can be used to record information that requires security against unauthorized use.

The above objects of the present invention are also achieved by a recording operation controlling program that is installed in a computer provided in an information recording device having a recording head for recording information on a recording medium. This program causes the computer to: generate an inherent ID for the recording medium; record the generated inherent ID on the recording medium with the recording head; generate an encryption key, based on the inherent ID; encrypt contents information, using the generated encryption key; and record the encrypted contents information on the recording medium with the recording head.

In accordance with this program, the information recording device generates an inherent ID for each recording medium, and causes the recording head to record the inherent ID on the recording head. Also, the inherent ID is used to generate an encryption key for encrypting contents information. Accordingly, the problem of failing to read out the inherent ID during a recording operation is eliminated, and the inherent ID can be acquired with certainty. Thus, the inherent ID can be handled properly, and can be utilized in the management of each recording medium and the recording with a copyrights protecting function. Also, as it is possible to use recording media on which inherent IDs are not recorded during the manufacturing process, inexpensive recording media can be used to record information that requires security against unauthorized use.

The above and other objects, features, and advantages of the present invention will become more apparent from the following detailed description taken in conjunction with the accompanying drawings.

DESCRIPTION OF THE PREFERRED EMBODIMENTS

The following is a description of embodiments of the present invention, with reference to the accompanying drawings.

First Embodiment

Figure 1:
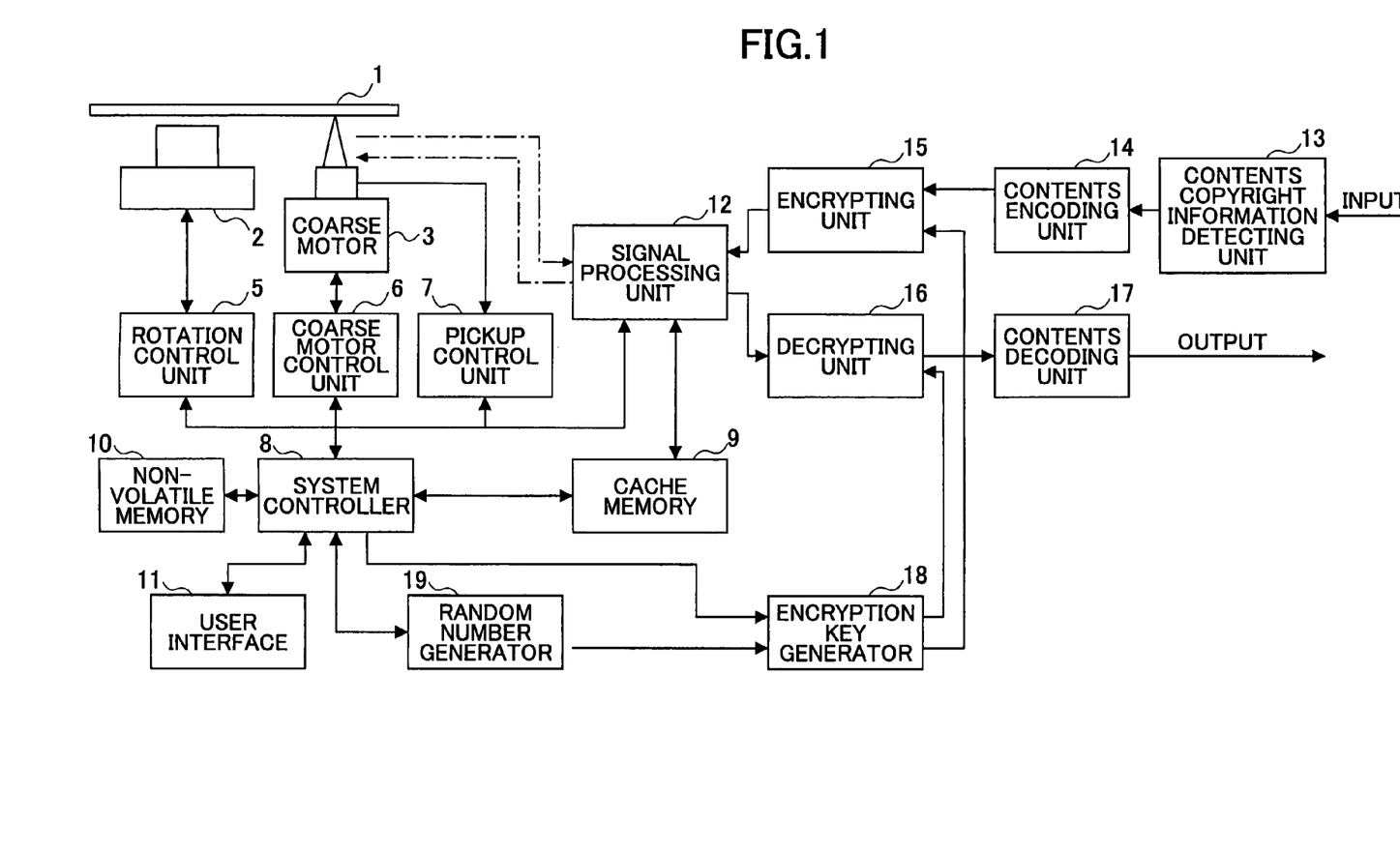
FIG. 1 is a block diagram illustrating an example structure of an optical disk recording and reproducing device in accordance with a first embodiment of the present invention.

Referring to FIGS. 1 through 4, a first embodiment of the present invention is described. An information recording device in accordance with this embodiment is an optical disk recording and reproducing device that uses a recordable optical disk 1 as a recording medium such as a DVD±R/RW disk. FIG. 1 is a block diagram illustrating an example structure of the optical disk recording and reproducing device.

In the optical disk recording and reproducing device, a spindle motor 2 and an optical pickup 3 are mounted. The spindle motor 2 rotationally drives the optical disk 1 loaded in the optical disk recording and reproducing device. The optical pickup 3 has a laser beam source and an objective lens, and serves as a recording head for recording or reproducing information by concentrating laser beams onto the rotating optical disk 1. The optical pickup 3 can be freely seek-moved by a coarse motor 4 in the radial direction of the optical disk 1. The spindle motor 2, the optical pickup 3, and the coarse motor 4 are connected to controllers 5, 6, and 7 each including a driver or the like. Those components are driven under the control of a system controller 8 that controls the entire optical disk recording and reproducing device.

Although not specifically shown, the system controller 8 has a microcomputer structure, including not only a CPU as a control main body but also a ROM that inflexibly stores control programs (including a recording control program) and various kinds of data, and a RAM that rewritably stores various kinds of data. A cache memory 9 and a non-volatile memory 10 are connected to the system controller 8. Also, a control panel that receives operations and instructions from users is connected to the system controller 8 via a user interface 11.

This optical disk recording and reproducing device is connected to a device (not shown) that can output digital contents, such as a television set, a digital tuner, or a personal computer, so as to process recorded or reproduced information. A signal processing unit 12 that processes recorded or reproduced information is interposed between the optical pickup 3 and the device that can output digital contents.

To perform an encrypting operation, if necessary, on contents information that is input from the device that can output digital contents, the optical disk recording and reproducing device of this embodiment has a recording system that includes a contents copyright information detecting unit 13, a contents encoding unit 14, and an encrypting unit 15. This optical disk recording and reproducing device has a reproducing system that includes a decrypting unit 16 and a contents decoding unit 17. The contents copyright information detecting unit 13 performs an operation to determine, by a known technique, whether the contents information input from the device that can output digital contents and is to be recorded on the optical disk 1 needs to be encrypted. The contents encoding unit 14 performs an operation to encode the contents information, which has been input from the device that can output digital contents, into encoded data suitable for recording on the optical disk 1. The encrypting unit 15 performs an operation to encrypt the encoded contents information, using an encryption key that is generated by an encryption key generator 18. The decrypting unit 16 performs an operation to decrypt the contents information, which is reproduced in the encrypted state, using the encryption key generated by the encryption key generator 18. The contents decoding unit 17 performs an operation to decode the decrypted information into the suitable state for the device that can output digital contents.

The optical disk recording and reproducing device of this embodiment characteristically has a random number generator 19 as an ID generator that generates an inherent ID for each optical disk 1 that is loaded in the device. The random number generator 19 generates a random number or a number having the serial number of the device as an inherent ID under the control of the system controller 8. The random number generator 19 then outputs the inherent ID to the system controller 8 and the encryption key generator 18. The system controller 8 issues an instruction to record the inherent ID, which is generated from the random number generator 19, at a designated address (a designated region) on the optical disk 1 or to store the inherent ID in the non-volatile memory 10. Based on the inherent ID that is generated from the random number generator 19 and is read from the non-volatile memory 10 or the optical disk 1, the encryption key generator 18 generates an encryption key that is necessary for encryption or decryption.

Figure 2:
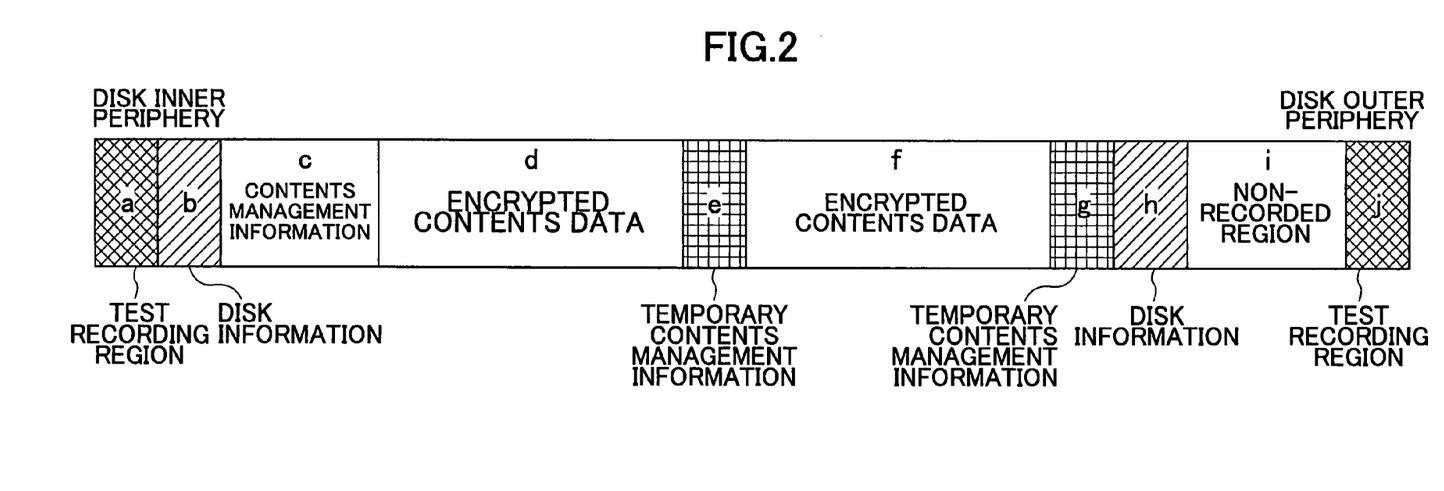
FIG. 2 shows a basic example structure of data that is recorded on an optical disk in accordance with the first embodiment.

Referring now to FIG. 2, an example of the data structure on the optical disk 1 on which data is recorded by a method in accordance with this embodiment is described. In this example, the data structure includes a test recording region "a", a disk management information region "b", a contents management information region "c", an encrypted contents information region "d", a temporary contents management information region "e", an encrypted contents information region "f", a temporary contents management information region "g", . . . , a disk information region "h", a non-recorded region "i", a test recording region "j", which are arranged in this order from the inner periphery of the optical disk 1.

The test recording region "a" is an introductory region for determining the optimum write laser power for performing a recording operation on the optical disk 1. The disk management information region "b" is a region in which the information as to the optical disk 1 such as the physical characteristics of the optical disk 1 is prerecorded. Based on this information, the optical disk recording and reproducing device can identify the type of the optical disk 1 loaded therein. In this embodiment, the inherent ID generated from the random number generator 19 is recorded in the disk management information region "b". By doing so, the inherent ID can be read out by a reproducing device. The contents management information region "c" is a region in which the management information as to the contents information that is encrypted and recorded in the contents information regions "d", "f", . . . is recorded. Here, the recorded information is obtained by copying the temporary contents management information recorded in the temporary contents management information region "g" in a finalizing operation performed on the optical disk 1. The temporary contents management information recorded in the temporary contents management information regions "e" and "g" is the information that is updated in every recording operation and is temporarily recorded so that the contents management data can be virtually updated on a write-once medium on which only one-time recording can be performed. The encrypted contents data recorded in the contents information regions d, f, . . . includes digital data of movies and broadcasting programs that are encrypted using an encryption key generated based on the inherent ID. The encrypted data cannot be decrypted and decoded by an unauthorized device that simply duplicates the data. The disk information region "h" is a region in which the reproduction of the contents information is terminated normally. In this region, the information for performing recording and reproducing on the optical disk 1 is also recorded. The non-recorded region "i" is a region in which contents data is not recorded. Since a write operation is not allowed after the finalizing operation, the non-recorded region "i" cannot be used after the finalizing operation. The test recording region "j" provides the same function as the test recording region "a".

Figure 3:
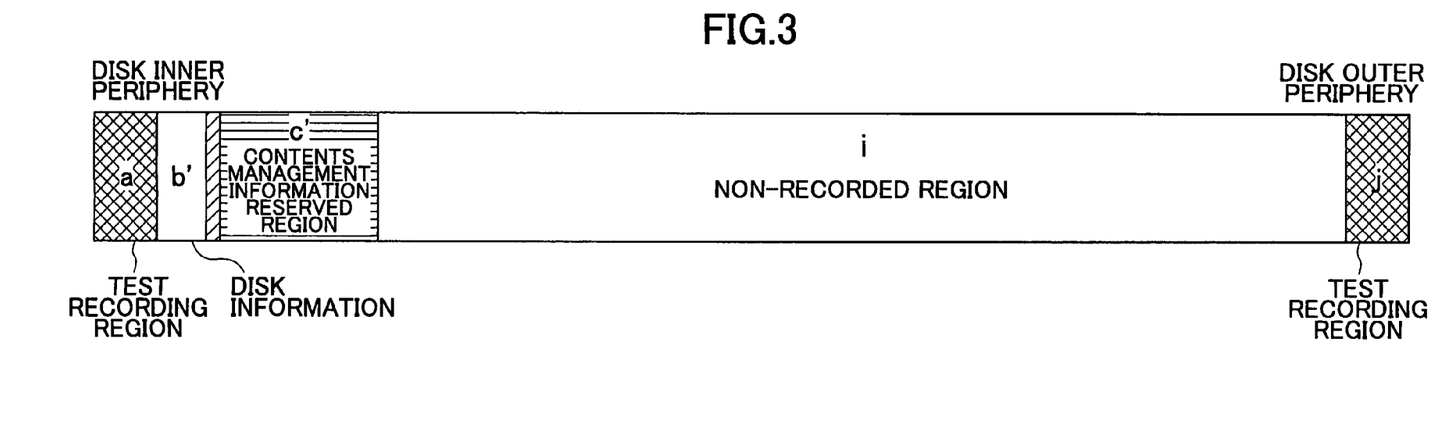
FIG. 3 schematically shows an example structure of the data immediately after a blank disk is loaded into the device and the inherent ID is recorded on the optical disk.

The operation of recording the inherent ID generated from the random number generator 19 in the disk management information region "b" is now described. The recording of the inherent ID is performed before the recording of contents information in the case where a blank disk (the optical disk 1 on which recording has not been performed yet) is loaded into the optical disk recording and reproducing device. FIG. 3 schematically illustrates an example of the structure of data recorded on the optical disk 1 immediately after the blank disk is loaded into the device and the inherent ID is recorded. In FIG. 3, only the inherent ID is recorded in the disk management information region "b" in which recording has not been performed. Recording has not been performed either in the contents management information regions. Instead, a reserved region "c'" is formed. Encrypted contents information is recorded in the non-recorded region "i" that follows the reserved region "c'".

Figure 4:
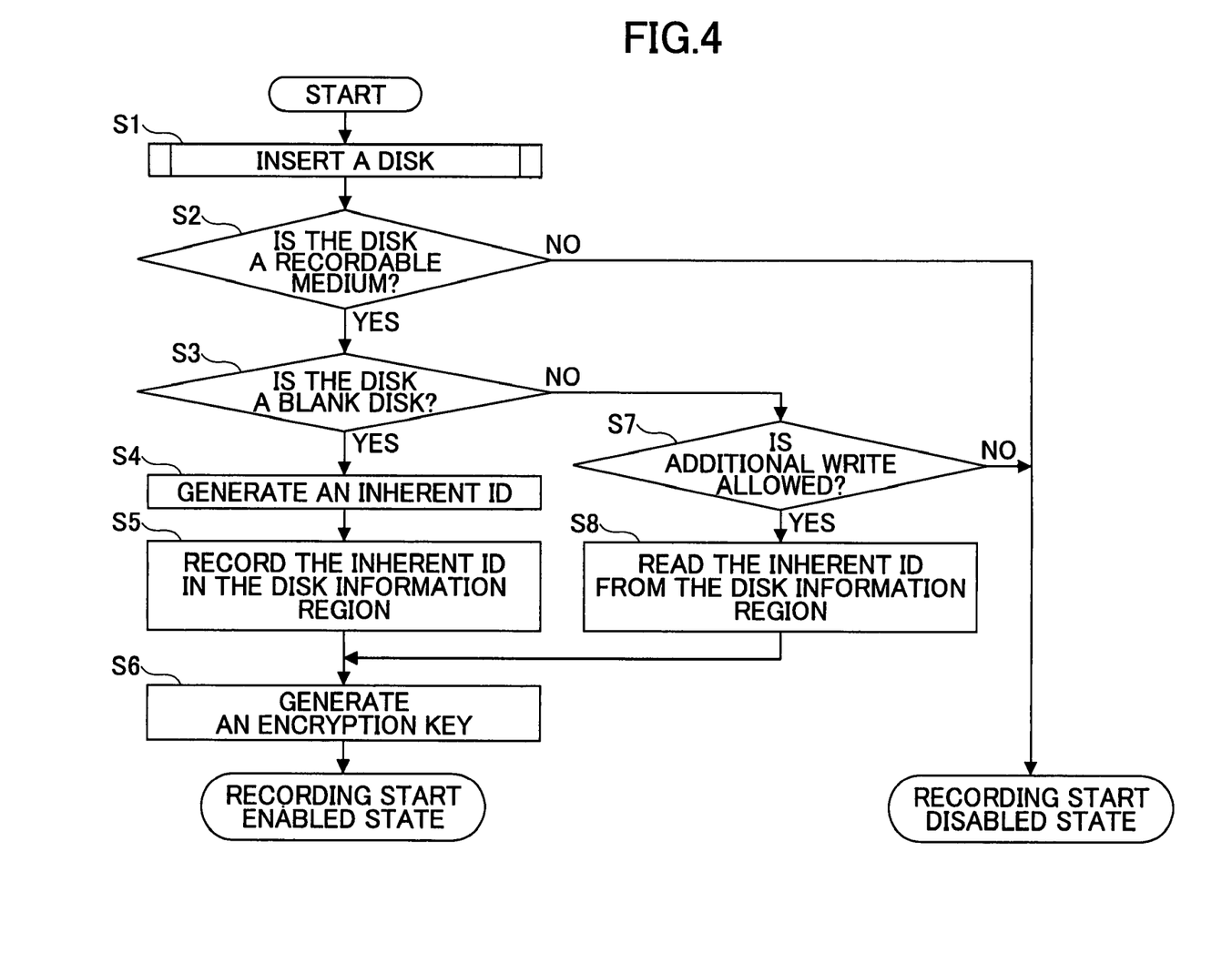
FIG. 4 is a flowchart of an example of a recording control operation in accordance with the first embodiment.

Referring now to the flowchart of FIG. 4, an example of the recording control operation to be performed by the CPU of the system controller 8 in accordance with a recording control program is described in detail.

First, the optical disk 1 is loaded into the device (step S1). The CPU determines whether the optical disk 1 is a recordable medium (step S2). If the optical disk 1 is a recordable medium ("YES" in step S2), the CPU determines whether the medium is a blank disk (the optical disk 1 in a non-recorded state) (step S3). If the medium is a blank disk ("YES" in step S3), the random number generator 19 generates the inherent ID for the optical disk 1 (step S4), and the optical pickup 3 records the generated inherent ID in the disk management information region b on the optical disk 1 (step S5). Here, the recording state illustrated in FIG. 3 is obtained. Using the generated inherent ID, the encryption key generator 18 generates an encryption key (step S6). Accordingly, the encrypting unit 15 can encrypt contents information, using the encryption key. Thus, it becomes possible to start recording the contents information having its copyright protected. The optical pickup 3 then records the encrypted contents information on the optical disk 1, starting from the top of the non-recorded region "i".

Meanwhile, if the medium is not a blank disk ("NO" in step S3), the CPU determines whether additional write is allowed (whether the disk is finalized) (step S7). If additional write is allowed ("YES" in step S7), the inherent ID information recorded at the time of the loading of the medium is read out from the disk management information region "b" (step S8). Using the read inherent ID, the encryption key generator 18 generates an encryption key (step S6). Accordingly, the encrypting unit 15 can encrypt contents information, using the encryption key. Thus, the contents information having its copyright protected can be recorded. The optical pickup 3 then records the encrypted contents information in the contest data region "f" in FIG. 2, for example.

If the optical disk 1 is not a recordable disk ('NO' in step S2), or if the additional write is not allowed ("NO" in step s7), the device is put into a recording start disabled state, and only a reproducing operation is allowed hereafter.

In this embodiment, the inherent ID for each optical disk 1 is generated in the optical disk recording and reproducing device, and the optical pickup 3 records the generated inherent ID on the optical disk 1. Also, an encryption key is generated to encrypt contents information. Accordingly, the problem of being not able to record the inherent ID during a recording operation is eliminated, and the inherent ID can be surely acquired. Thus, the inherent ID can be properly handled, and can be used in a recording operation with a copyright protecting function such as the above described recording of encrypted contents information. Also, the optical disk 1 not having an inherent ID recorded thereon can be used in the manufacturing stage, and accordingly, a less expensive recording medium can be used in a recording operation that requires security. Especially, in this embodiment, the inherent ID is recorded on the optical disk 1 immediately after the optical disk 1 in a non-recorded state is loaded into the device. Accordingly, the possibility of losing or erasing the inherent ID is low during the time between the start and the end of the contents information recording. When the inherent ID is required, it can be read out from the predetermined location (the disk management information region "b") on the optical disk 1 loaded in the device. Thus, the use of the inherent ID can be secured. Further, since the inherent ID is recorded on the optical disk 1 on which recording has not been performed, highly reliable inherent ID recording can be performed, compared with a case where an inherent ID is recorded on other recorded data.

Second Embodiment

Figure 5:
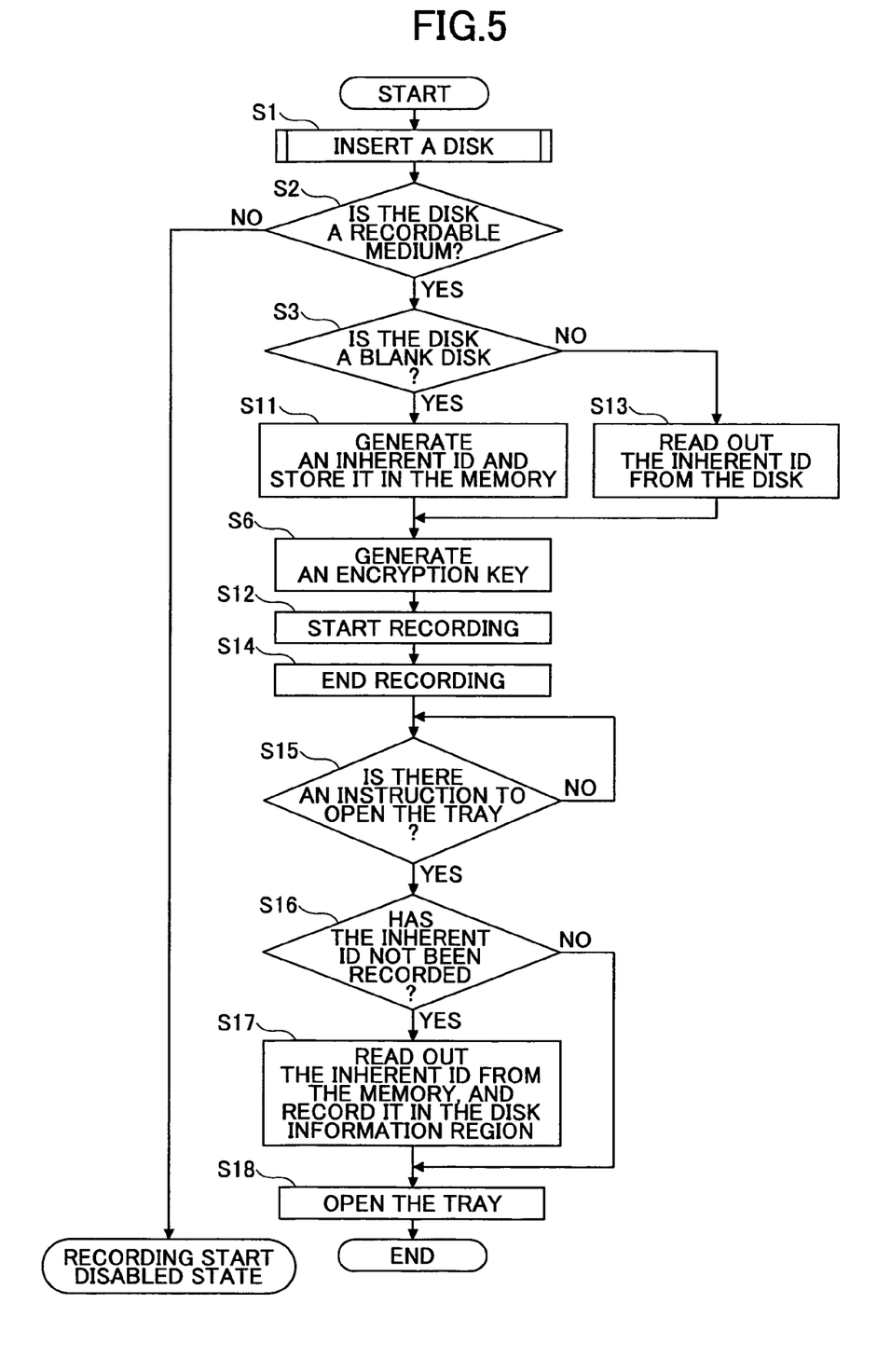
FIG. 5 is a flowchart of an example of a recording control operation in accordance with a second embodiment of the present invention.

Referring now to FIG. 5, a second embodiment of the present invention is described. In the following description, the same components as those of the first embodiment are denoted by the same reference numerals as those used in the first embodiment, and explanation of them is omitted (the same applies to other embodiments described later). This embodiment is basically the same as the first embodiment, except that the inherent ID generated from the random number generator 19 is recorded on the optical disk 1 in different timing from that in the first embodiment. More specifically, the inherent ID is recorded on the optical disk 1 when an instruction to open the tray is issued from a user.

Referring to the flowchart of FIG. 5, an example of the recording control operation to be performed by the CPU of the system controller 8 in accordance with a recording control program is described in detail.

First, the optical disk 1 is loaded into the device (step S1). The CPU determines whether the optical disk 1 is a recordable medium (step S2). If the optical disk 1 is a recordable medium ("YES" in step S2), the CPU determines whether the medium is a blank disk (the optical disk 1 in a non-recorded state) (step S3). If the medium is a blank disk ("YES" in step S3), the random number generator 19 generates the inherent ID for the optical disk 1, and the inherent ID is temporarily stored in the non-volatile memory 10 (or the cache memory 9) (step S11). Using the generated inherent ID, the encryption key generator 18 generates an encryption key (step S6). Accordingly, the encrypting unit 15 can encrypt contents information, using the encryption key. Thus, it becomes possible to start recording the contents information having its copyright protected. The optical pickup 3 then records the encrypted contents information on the optical disk 1, starting from the top of the non-recorded region "i" (step S12).

Meanwhile, if the medium is not a blank disk ("NO" in step S3), the inherent ID recorded in the disk management information region b on the optical disk 1 is read out through an operation described later (step S13). Using the read inherent ID, the encryption key generator 18 generates an encryption key (step S6). Accordingly, the encrypting unit 15 can encrypt contents information, using the encryption key. Thus, the contents information having its copyright protected can be recorded. The optical pickup 3 then records the encrypted contents information in the contest data region "f" in FIG. 2, for example (step S12).

After that, the contents information recording is ended in accordance with an instruction from the user or as the disk capacity is reached (step S14). When the user issues an instruction to open the tray ("YES" in step S15), the CPU determines whether the inherent ID has not been recorded in the disk management information region "b" before the tray is opened (step S16). If the inherent ID has not been recorded ("YES" in step S16), the inherent ID is read out from the non-volatile memory 10 (or the cache memory 9), and the optical pickup 3 records the inherent ID in the disk management information region "b" on the optical disk 1. Here, the recorded state illustrated in FIG. 2 is obtained. After the inherent ID is recorded, the tray is opened (step S18), and the series of procedures is ended.

As described above, in addition to the effects of the first embodiment, this embodiment eliminates the necessity of recording or recording the inherent ID on or from the optical disk 1 until a user issues an instruction to open the tray. The inherent ID can be read out from the non-volatile memory 10 (or the cache memory 9), and accordingly, the possibility of failing to read out the inherent ID is greatly lowered. Thus, the inherent ID can be more properly handled.

Third Embodiment

Referring now to FIGS. 6 through 9, a third embodiment of the present invention is described. This embodiment is basically the same as the first and second embodiments, except that the inherent ID generated from the random number generator 19 is recorded on the optical disk 1 in different timing from that in the first or second embodiment. More specifically, the inherent ID is recorded on the optical disk 1 when an instruction to perform a finalizing operation (to prohibit additional write) is issued from a user.

Figure 6:
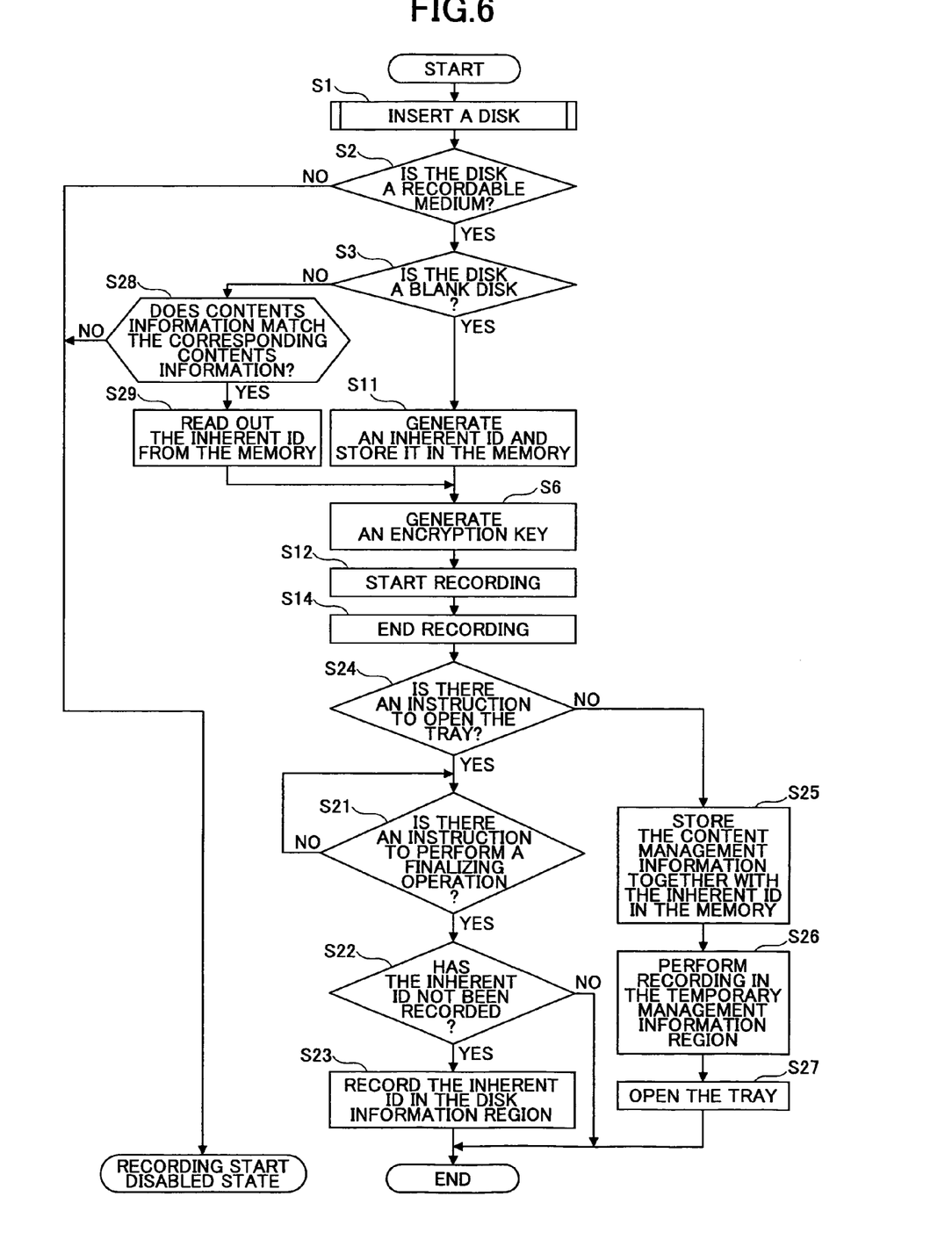
FIG. 6 is a flowchart of an example of a recording control operation in accordance with a third embodiment of the present invention.

Referring to the flowchart of FIG. 6, an example of the recording control operation to be performed by the CPU of the system controller 8 in accordance with a recording control program is described in detail.

First, the optical disk 1 is loaded into the device (step S1). The CPU determines whether the optical disk 1 is a recordable medium (step S2). If the optical disk 1 is a recordable medium ("YES" in step S2), the CPU determines whether the medium is a blank disk (the optical disk 1 in a non-recorded state) (step S3). If the medium is a blank disk ("YES" in step S3), the random number generator 19 generates the inherent ID for the optical disk 1, and the inherent ID is temporarily stored in the non-volatile memory 10 (or the cache memory 9) (step S1). Using the generated inherent ID, the encryption key generator 18 generates an encryption key (step S6). Accordingly, the encrypting unit 15 can encrypt contents information, using the encryption key. Thus, it becomes possible to start recording the contents information having its copyright protected. The optical pickup 3 then records the encrypted contents information on the optical disk 1, starting from the top of the non-recorded region "i" (step S12).

After that, the contents information recording is ended in accordance with an instruction from the user or as the disk capacity is reached (step S14). When the user issues an instruction to perform a finalizing operation (to prohibit additional write) ("YES" in step S21), the CPU determines whether the inherent ID has not been recorded in the disk management information region "b" during the series of finalizing procedures (step S22). If the inherent ID has not been recorded ("YES" in step S22), the inherent ID is read out from the non-volatile memory 10 (or the cache memory 9), and the optical pickup 3 records the inherent ID in the disk management information region "b" on the optical disk 1 (S23). Here, the recorded state illustrated in FIG. 2 is obtained. (However, additional write in the non-recorded region "i" is disabled, as the finalizing operation has been performed.)

If an instruction to open the tray is issued from the user before the instruction to perform the finalizing operation is issued ("YES" in step S24), the inherent ID is associated with the contents management information (such as the recording starting time and ending time) corresponding to the inherent ID stored in the memory and the recorded contents information. The inherent ID accompanied by the contents management information is then stored in the non-volatile memory 10 (step S25). The contents management information is updated every time an instruction to stop contents information recording is issued. The contents management information is written as temporary contents management information in a region behind the contents data region on the optical disk 1. The contents management information is not to be encrypted, and can be regularly read out.

Figure 7:
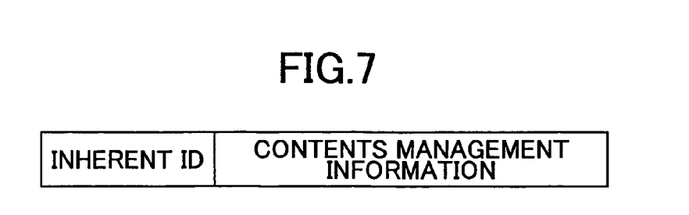
FIG. 7 shows an example structure of data that is stored in a non-volatile memory in which each inherent ID is associated with contents management information.
Figure 8:
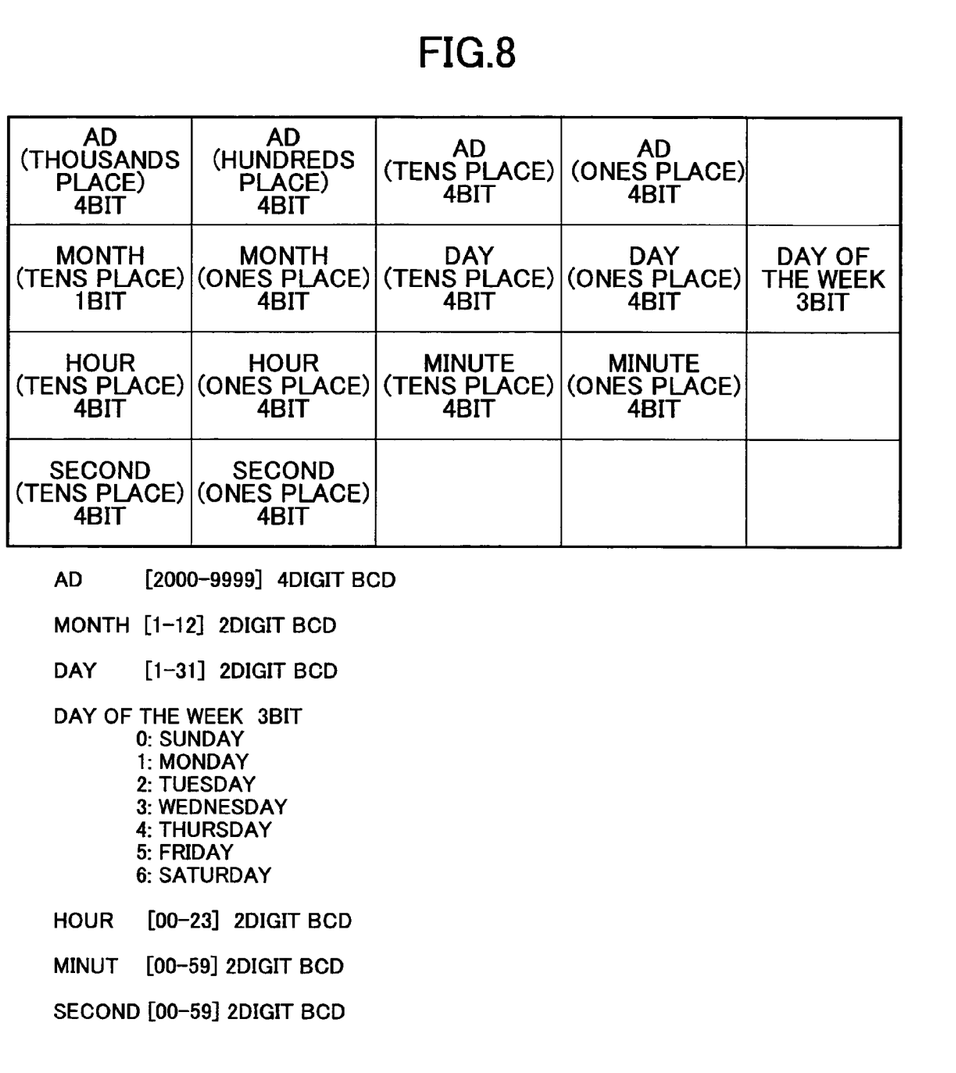
FIG. 8 shows an example of the format of the contents management information.

FIG. 7 shows an example of the structure of data stored in the non-volatile memory 10 in which the inherent ID is associated with the contents management information. FIG. 8 shows an example of the format of the contents management information. In FIG. 8, the data items include date, day of the week, and time (h/m/s) to represent the recording starting time and ending time. Accordingly, the tray is opened (step S27), with the encrypted contents information being recorded through the procedure of step S12 and the content management information being recorded through the procedure of step S26 on the optical disk 1.

Figure 9:
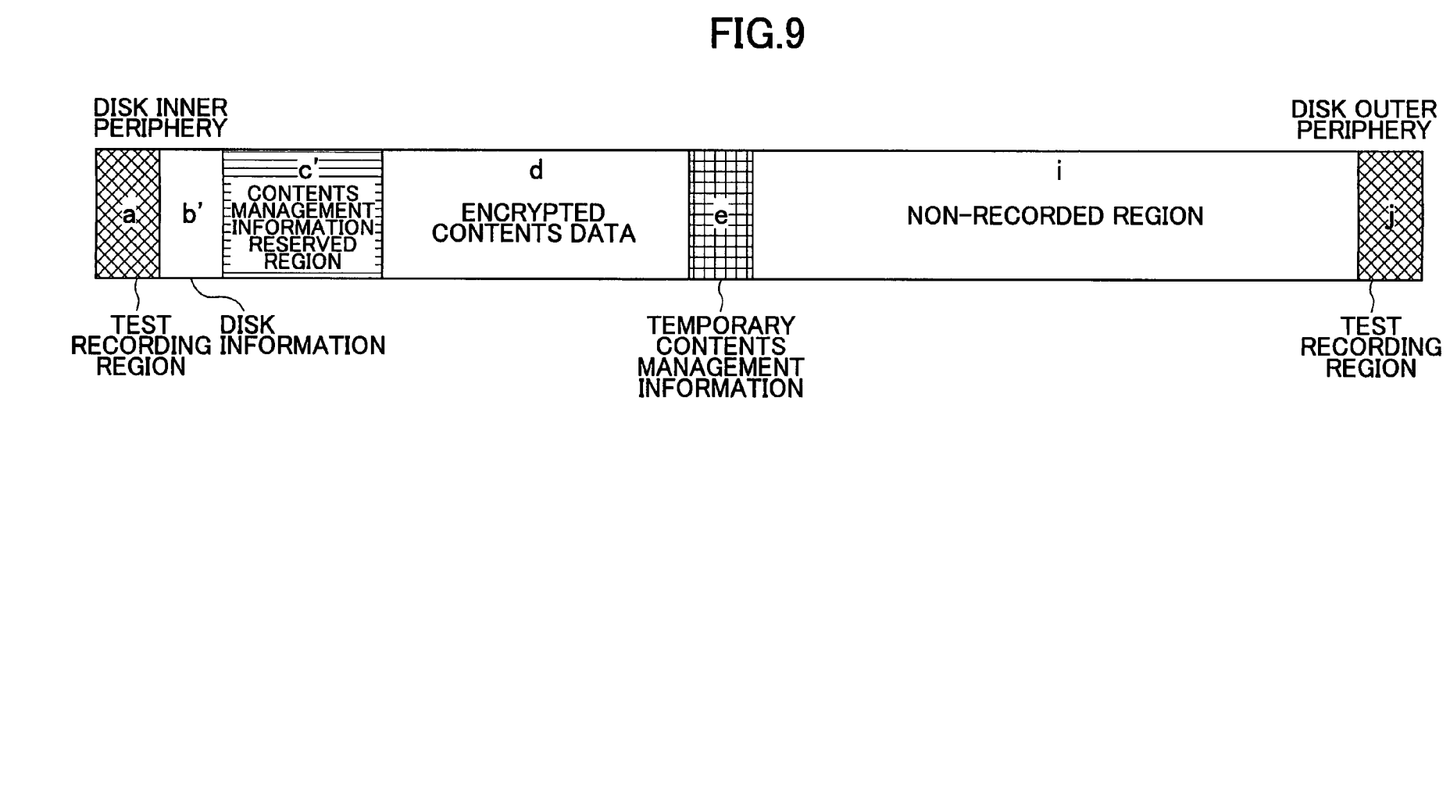
FIG. 9 shows an example structure of data that is recorded only once on the optical disk.

FIG. 9 shows an example of the structure of data that is recorded only once on the optical disk 1. In FIG. 9, the inherent ID has not been recorded in the disk management information region "b". In this situation, the contents data cannot be decrypted by another optical disk recording and reproducing device, and cannot be decoded and reproduced accordingly.

When the optical disk 1 is inserted again in the optical disk recording and reproducing device, the medium is not a blank disk ("NO" in step S3). The reproducible contents management information recorded on the optical disk 1 is compared with the contents management information stored in the non-volatile memory 10 (step S28). If the reproducible contents management information recorded on the optical disk 1 matches the contents management information stored in the non-volatile memory 10 ("YES" in step S28), the optical disk 1 is identified as a normal disk, and the inherent ID associated with the contents management information is read out from the non-volatile memory 10 (step S29). Using the read inherent ID, the encryption key generator 18 generates an encryption key (step S6). Using the encryption key, the encrypting unit 15 can encrypt contents information. Thus, it becomes possible to start recording the contents information having its copyright protected. The optical pickup 3 then records the encrypted contents information on the optical disk 1, starting from the top of the non-recorded region "i" (step S12).

In this embodiment, the inherent ID is not recorded on the optical disk 1 until the instruction to perform the finalizing operation to disable additional write is issued to terminate the recording on the optical disk 1. Therefore, it is not necessary to record or read the inherent ID on or from the optical disk 1 before the instruction to perform the finalizing operation is issued. The inherent ID can be simply read out from the non-volatile memory 10, and accordingly, the possibility of failing to read out the inherent ID is greatly lowered. Thus, the inherent ID can be more properly handled. Especially, since the inherent ID is not recorded on the optical disk 1 until the instruction to perform the finalizing operation is issued, the encrypted contents information cannot be decrypted, when the optical disk 1 removed before the finalizing operation is loaded into another optical disk reproducing device. Thus, the security for the contents information can be further increased. Also, in the case where the optical disk 1 is removed in accordance with an instruction to open the tray before the finalizing operation and the optical disk 1 is reloaded into the device, the identification of the optical disk 1 can be correctly determined and the inherent ID can be properly acquired.

Fourth Embodiment

Figure 10:
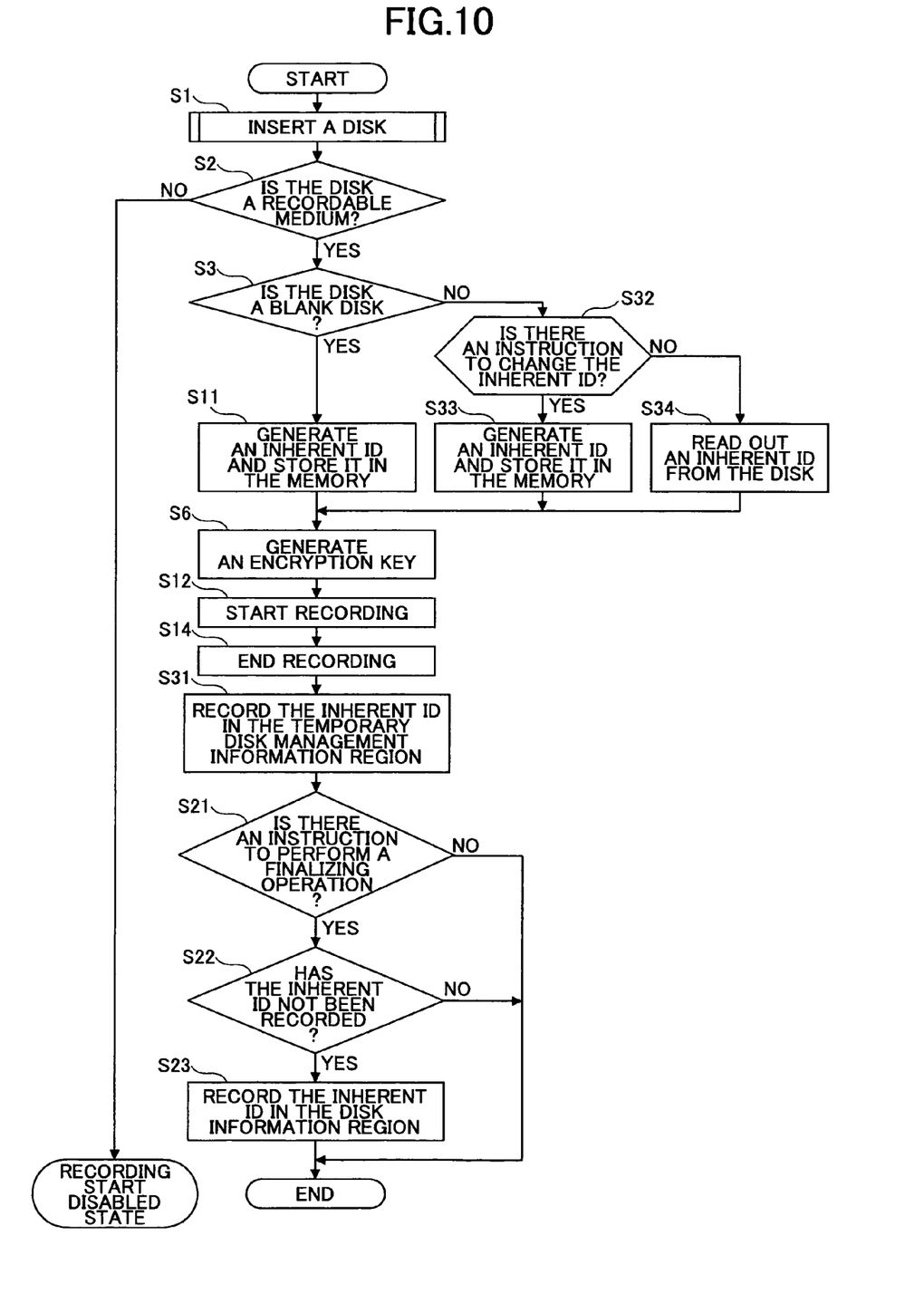
FIG. 10 is a flowchart of an example of a recording control operation in accordance with a fourth embodiment of the present invention.
Figure 11:
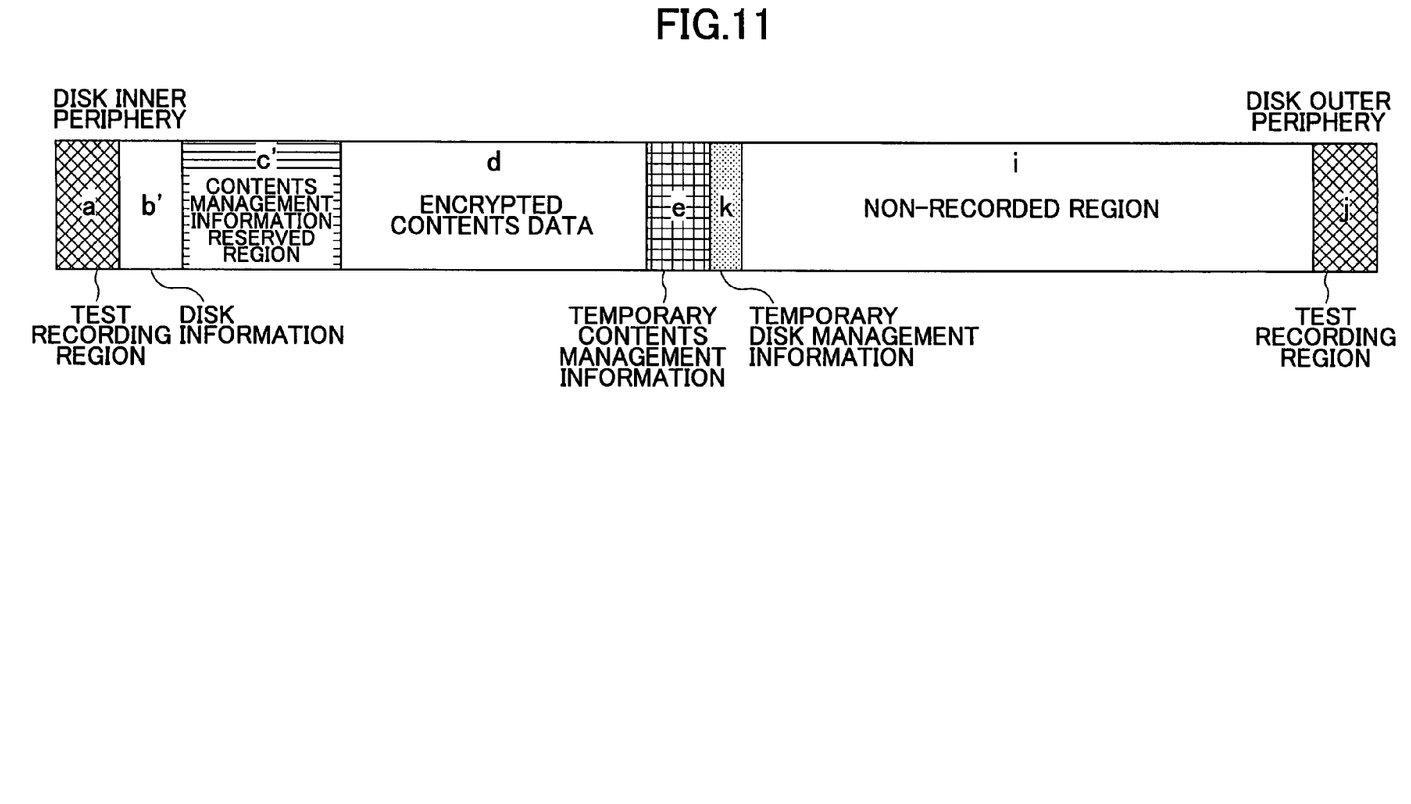
FIG. 11 shows an example structure of data that is recorded on the optical disk immediately after contents information is recorded.

Referring now to FIGS. 10 and 11, a fourth embodiment of the present invention is described. This embodiment is basically the same as the third embodiment, except that the inherent ID generated from the random number generator 19 is recorded on the optical disk 1 in different timing from that in the third embodiment.

Referring to the flowchart of FIG. 10, an example of the recording control operation to be performed by the CPU of the system controller 8 in accordance with a recording control program is described in detail.

First, the optical disk 1 is loaded into the device (step S1). The CPU determines whether the optical disk 1 is a recordable medium (step S2). If the optical disk 1 is a recordable medium ("YES" in step S2), the CPU determines whether the medium is a blank disk (the optical disk 1 in a non-recorded state) (step S3). If the medium is a blank disk ("YES" in step S3), the random number generator 19 generates the inherent ID for the optical disk 1, and the inherent ID is temporarily stored in the non-volatile memory 10 (or the cache memory 9) (step S11). Using the generated inherent ID, the encryption key generator 18 generates an encryption key (step S6). Accordingly, the encrypting unit 15 can encrypt contents information, using the encryption key. Thus, it becomes possible to start recording the contents information having its copyright protected. The optical pickup 3 then records the encrypted contents information on the optical disk 1, starting from the top of the non-recorded region "i" (step S12).

After that, when the contents information recording is ended in accordance with an instruction from the user (step S14), the contents management information is recorded in the temporary contents management information region "e". The optical pickup 3 then records the inherent ID, which is used to encrypt the contents information, in an unused area in a temporary disk management information region (a temporary media management information region) k in which the management data as to non-recorded regions is recorded (step S31). The recording of the inherent ID is performed every time contents information is recorded.

FIG. 11 shows the structure of data recorded on the optical disk 1 after contents information is recorded. After the contents information is recorded in the region "d", the temporary contents management information and the temporary disk management information such as the management data as to the non-recorded regions on the optical disk 1 are recorded in the regions "e" and "k", respectively. The inherent ID information used to encrypt the contents information is recorded in the data structure of the temporary disk management information region "k". Accordingly, the recording of the inherent ID is performed every time contents information is recorded.

In this embodiment, the inherent ID can be freely updated or changed. If the optical disk is reloaded into the device (steps S1 and S2, and "NO" in step S3), and if an instruction to nullify the contents information recorded on the optical disk 1 is issued from a user ("YES" in step S32), the random number generator 19 generates a new inherent ID for the optical disk 1, and the new inherent ID is temporarily stored in the non-volatile memory 10 (or the cache memory 9) (step S32). Using the new inherent ID, the encryption key generator 18 generates a new encryption key (step 6). Accordingly, the encrypting unit 15 can encrypt contents information, using the new encryption key. Thus, it becomes possible to start recording the contents information having its copyright protected. The optical pickup 3 then records the encrypted contents information on the optical disk 1 (step S12).

After that, when the contents information recording is ended in accordance with an instruction from the user (step. S14), the contents management information is recorded in the temporary contents management information region "e". The optical pickup 3 then records the inherent ID, which is used to encrypt the contents information, in an unused area in the temporary disk management information region (the temporary media management information region) k in which the management data as to non-recorded regions is recorded (step S31). The recording of the inherent ID is performed every time contents information is recorded.

After that, when the user issues an instruction to perform a finalizing operation (to disable additional write) ("YES" in step S21), the CPU determines whether the inherent ID has not been recorded in the disk management information region "b" during the series of finalizing procedures (step S22). If the inherent ID has not been recorded ("YES" in step S22), the ultimate inherent ID is read out from the non-volatile memory 10 (or the cache memory 9), and the optical pickup 3 records the ultimate inherent ID in the disk management information region "b" on the optical disk 1 (step S23).

In this embodiment, every time the recording of encrypted contents information is ended, the inherent ID is read out from the memory and is recorded in an unused area in the temporary disk management information region. Accordingly, the contents information can be recorded in such a format that the inherent ID can be easily updated or changed in response to a request to nullify already recorded contents information. More specifically, when a request to nullify the recorded contents information is made, the inherent ID is updated or changed in accordance with a user instruction in the recording of contents information thereafter. In the case where the ultimate inherent ID is set in accordance with an instruction to perform a finalizing operation on the optical disk 1, the ultimate inherent ID is recorded in the disk management information region. Accordingly, the contents information that has been encrypted using inherent ID other than the ultimate inherent ID before the updating cannot be decrypted, and reproduction of the contents information can be prevented. Thus, the contents information can be protected as desired by the user.

Fifth Embodiment

Figure 12:
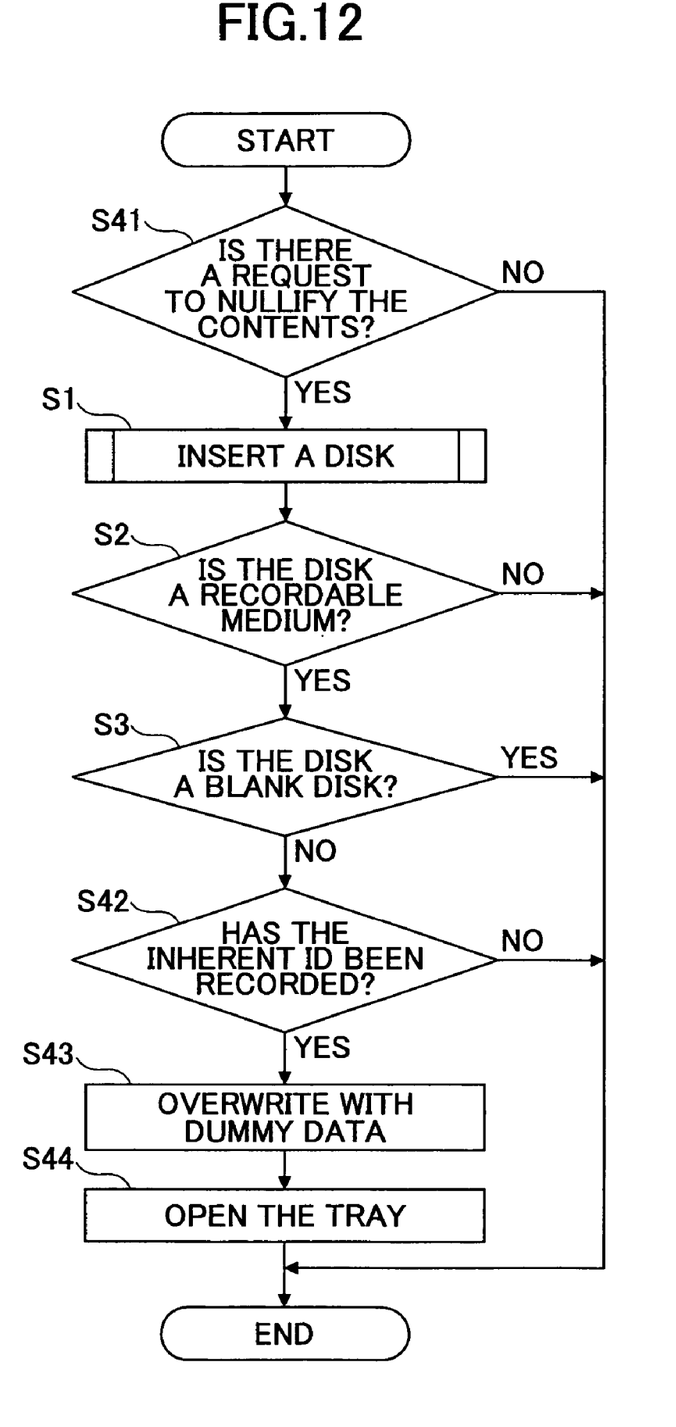
FIG. 12 is a flowchart of an example of a recording control operation in accordance with a fifth embodiment of the present invention.

Referring now to FIG. 12, a fifth embodiment of the present invention is described. This embodiment may be applied to any of the foregoing embodiments, relating to an operation to be performed when there is a user request to nullify all the contents information recorded on an optical disk 1.

Referring to the flowchart of FIG. 12, an example of the recording control operation to be performed by the CPU of the system controller 8 in accordance with a recording control program is described in detail.

First, the optical disk 1 is loaded into the device (step S1). The CPU then determines whether a contents information nullifying request has been issued from a user (step S41). If the request has been issued ("YES" in step S41), the CPU determines whether the optical disk 1 is a recordable medium (step S2). If the optical disk 1 is a recordable medium ("YES" in step S2), the CPU determines whether the medium is a blank disk (the optical disk 1 in a non-recorded state) (step S3). If the medium is a blank disk ("YES" in step S3), the operation comes to an end. If the medium is not a blank disk ("NO" in step S3), the CPU determines whether the inherent ID has been recorded in the disk management information region "b" (step S42). If the inherent ID has been recorded in the disk management information region "b" ("YES" in step S42), the optical pickup 3 performs an overwrite using dummy data at the address of the inherent ID in the disk management information region "b" (step S43). After that, the tray is opened (step S44), and the optical disk 1 is removed. In step S43, the operation to be performed is not limited to the overwrite using dummy data, but a recording operation to disable the readout of the inherent ID may be performed by the optical pickup 3 on the region in which the inherent ID is recorded.

In this embodiment, a recording operation to disable the readout of an inherent ID is performed on the region in which the inherent ID is recorded. Therefore, if the optical disk 1 is to be discarded, other data such as dummy data is overwritten on the inherent ID, so that the inherent ID cannot be read out. In this manner, the contents information that is encrypted using the inherent ID cannot be read out. Thus, the discard of an optical disk can be easily carried out, while high information security is maintained. Also, in a data transferring operation to copy the data from the optical disk 1 to another optical disk before the optical disk 1 is discarded, the operation can be readily performed, while high information security is maintained.

It should be noted that the present invention is not limited to the embodiments specifically disclosed above, but other variations and modifications may be made without departing from the scope of the present invention.

This patent application is based on Japanese Priority Patent Application No. 2004-114077, filed on Apr. 8, 2004, the entire contents of which are hereby incorporated by reference.

What is claimed is:

1. An information recording device that has a recording head for recording information on a recording medium, comprising:
- an inherent ID generator that generates an inherent ID for the recording medium;
- an inherent ID recording unit that records the generated inherent ID on the recording medium with the recording head;
- an encryption key generator that generates an encryption key, based on the inherent ID;
- an encrypting unit that encrypts contents information, using the generated encryption key;
- a contents recording unit that records the encrypted contents information on the recording medium with the recording head; and
- a disabling unit that causes the recording head to perform a recording operation on the region in which the inherent ID of a writable recording medium is recorded, thereby overwriting the inherent ID with dummy data so as to disable readout of the inherent ID.

2. The information recording device as claimed in claim 1, further comprising:
- an inherent ID storing unit that stores the generated inherent ID in a memory,
- wherein the encryption key generator generates the encryption key, based on the inherent ID that is read out from the memory, and
- wherein the inherent ID recording unit reads out the inherent ID from the memory, and records the inherent ID on the recording medium at a time when an instruction to remove the recording medium is issued.

3. The information recording device as claimed in claim 1, further comprising:
- an inherent ID storing unit that stores the generated inherent ID in a memory,
- wherein the encryption key generator generates the encryption key, based on the inherent ID that is read out from the memory, and
- wherein the inherent ID recording unit reads out the inherent ID from the memory, and records the inherent ID on the recording medium at a time when an instruction to perform a finalizing operation on the recording medium is issued.

4. The information recording device as claimed in claim 3, further comprising:
- a management information storing unit that stores contents management information corresponding to the encrypted contents information in a non-volatile memory when an instruction to remove the recording medium is issued before the instruction to perform the finalizing operation is issued, wherein the contents management information is recorded together with the encrypted contents information on the recording medium and is associated with the inherent ID; and
- an inherent ID readout unit that reads out the inherent ID from the non-volatile memory, when the recording medium is reloaded into the device, and the contents management information recorded on the recording medium matches the contents management information stored in the non-volatile memory.

5. The information recording device as claimed in claim 1, further comprising:
- an inherent ID storing unit that stores the generated inherent ID in a memory,
- wherein the encryption key generator generates the encryption key, based on the inherent ID that is read out from the memory or the recording medium, and
- wherein the inherent ID recording unit reads out the inherent ID from the memory and records the inherent ID in an unused area in a region for temporary media management information that is generated every time an operation of recording encrypted contents information is ended.

6. The information recording device as claimed in claim 5, wherein the inherent ID generator generates a new inherent ID in accordance with an instruction from a user, and
wherein the inherent ID recording unit sets an ultimate inherent ID and records the ultimate inherent ID in a media management information region on the recording medium, when an instruction to perform a finalizing operation on the recording medium is issued.

* * * * *